May 20, 1930.  W. WISHART  1,759,029
STUFFING BOX PACKING
Filed Jan. 6, 1926
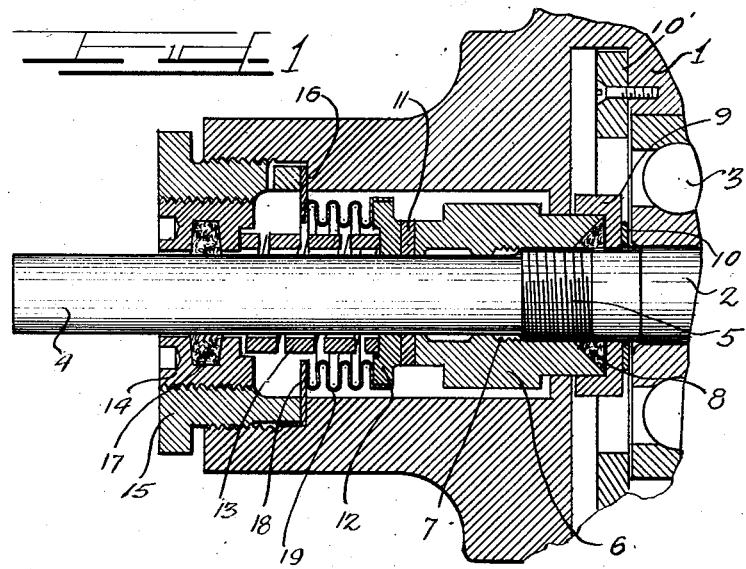
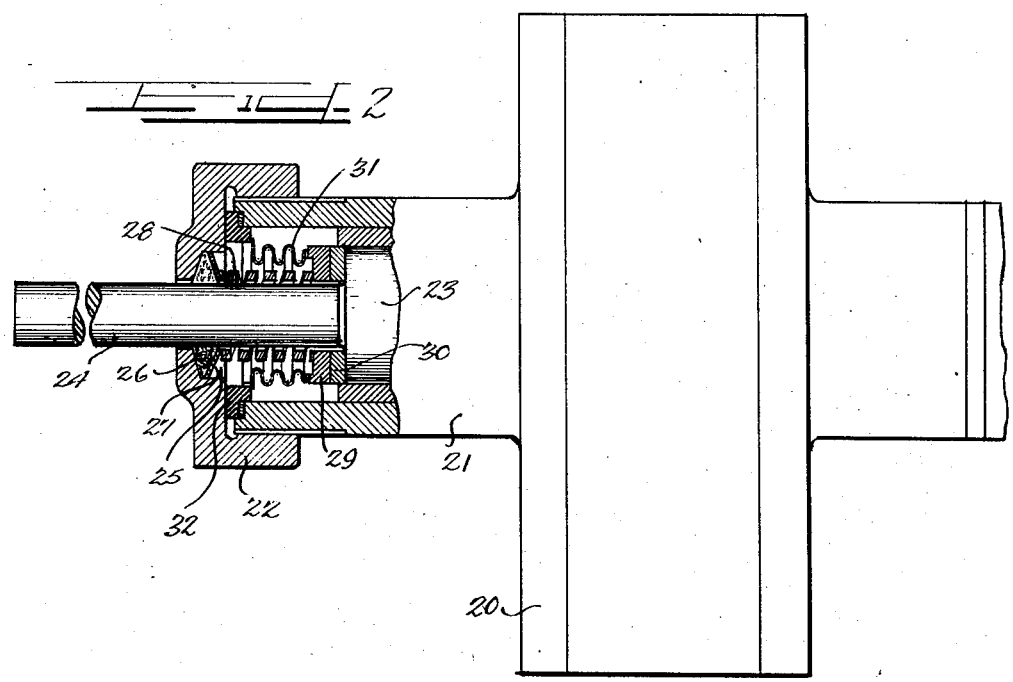
INVENTOR
William Wishart.
Charles F. Hills
BY  ATTYS Patented May 20, 1930

1,759,029

UNITED STATES PATENT OFFICE

WILLIAM WISHART, OF CLINTON, IOWA, ASSIGNOR TO CLIMAX ENGINEERING COMPANY, OF CLINTON, IOWA, A CORPORATION OF DELAWARE

STUFFING-BOX PACKING

Application filed January 6, 1926. Serial No. 79,670.

This invention relates to bellows type seals and more particularly to self lubricating seals, although it may be employed with equal advantage for other purposes.

One object of the present invention is to provide an improved high pressure seal which is adjustable to compensate for wear.

Another object is the provision of a novel bellows type seal having a stuffing box packing associated therewith for effecting a hermetic seal between relatively movable members.

Other objects and advantages will appear from the following description of an illustrated embodiment of the present invention.

In the drawings:

Figure 1 is a sectional view in elevation of a structure embodying features of the present invention.

Figure 2 is a sectional view in elevation of a modified structure.

The structure illustrated in Figure 1 comprises a compressor casing 1 within which a crank shaft 2 is journaled in a suitable ball-bearing 3 of standard construction, the shaft 2 terminating in a reduced portion 4 projecting through the opening in the casing. A threaded portion 5 intermediate portions 2 and 4, threadedly receives a sleeve 6 preferably of hardened steel defining a shoulder, it being provided with an internally threaded portion 7 engaging the threaded portion 5 to permit axial adjustment thereof along the shaft.

The sleeve 6 is provided with a conical end face wherein is seated a correspondingly shaped packing ring 8 which is retained therein by means of a disc-shaped cap 9 having a peripheral, normally projecting flange overlying the extremity of the sleeve 6 whereby the packing 8 is caused to embrace the shaft to prevent leakage therealong.

Another packing ring 10 surrounding the shaft 2, is interposed between the cap 9 and the bearing 3, the latter being maintained against axial movement along the shaft by means of a ring plate 10′ secured in any suitable manner to the interior of the casing 1 in abutting relation with the race-ways of the bearing 3. Associated with the shaft 4 is a floating sealing ring 11 preferably of bronze having a lateral face thereof abutting the shoulder defined by the outer end face of the sleeve 6, it being maintained thereagainst by means of a steel collar 12 slidable along the shaft 4.

A spiral spring 13 envelopes the shaft 4, and is interposed between the collar 12 and a plug 14 which has the periphery thereof threaded to engage a concentrically spaced plug 15. The plug 15 is in threaded engagement with the outer or open end of the casing 1 which is recessed to provide an annular shoulder 16 for limiting the inward movement of the plug 15, the plug 14 being independently adjustable to vary the tension of the spring 13 which normally urges the collar 12 in frictional engagement with the sealing ring 11 contacting with the sleeve 6 to effect a hermetic seal therebetween for purposes which will appear hereinafter. The plug 14 is provided with an interior annular recess having therein provided a suitable packing member 17 which embraces the shaft 4 to prevent leakage therealong.

Interposed between the plug 15 and the annular shoulder 16 of the casing 1, is a centrally apertured disc 18 hermetically sealed to the casing 1 by tightly drawing up the plug 15 as is obvious from the showing. A corrugated, axially expansible sheath 19 envelopes the spring 13, and has the ends thereof hermetically sealed to the collar 12 and disc 18 in any suitable manner to prevent communication between the two chambers defined by the sheath 19 with the casing 1 and the shaft 4.

With this arrangement of parts, it will be apparent, that leakage along the shaft is prevented by means of the packing members 8 and 17, whereas a hermetic seal is effected between the relatively rotating members 6 and 12 through the medium of the sealing ring 11 whereby communication between the chambers defined by the sheath 19 is prevented, the latter being hermetically sealed to the casing 1 by means of the disc 18 to which it is secured. It is to be noted that wear on the sealing ring 11 will be compensated for by the spring 13, the tension of which may be conveniently varied by manipulating the plug in an obvious manner.

Figure 2 discloses a modified structure comprising a compressor housing or casing 20 having a sleeve extension 21 on the outer end of which a retaining cap 22 is secured. The compressor crank shaft 23 is provided with a shaft extension 24 which projects outwardly through the retaining cap 22. Seated in a recess 25 of the retaining cap is a double conical packing ring 26, against the inner conical face of which a conical washer 27 is seated. Contacting the conical washer 27 is a heavy coiled spring 28, the inner end of which seats against the outer face of a hardened steel ring 29. Positioned between the hardened steel ring 29 and a shoulder of the crank shaft 23 is a bronze floating washer 30. Also engaged against the marginal portion of the outer face of the hardened steel ring 29 is one end of a corrugated sleeve 31, the outer end of which bears against a flanged ring member 32 held against the end of the sleeve extension 21 by the retaining cap 22.

I am aware that many changes may be made and numerous details of construction may be varied through a wide range without departing from the principles of this invention and I therefore do not purpose limiting the patent granted hereon otherwise than necessitated by the prior art.

I claim as my invention:

1. The combination with a shaft and a bearing housing therefor, of a packing unit engaged in said bearing housing around said shaft and comprising a floating washer, a sleeve in threaded engagement with the shaft positioned adjacent one side thereof, a hardened steel ring positioned adjacent the other side thereof, a coiled spring engaged around said shaft contacting said ring to hold the same in frictional engagement with said floating washer, a corrugated sheath enveloping said coiled spring with one end thereof sealed to said ring, a ring disk engaged in said housing to which the outer end of said corrugated sheath is hermetically sealed, a retaining cap removably threaded into said housing for holding said ring disk in position, a plug sleeve adjustably engaged in said retaining cap adapted to engage against the outer end of said coiled spring, and a packing ring carried by said plug sleeve for frictionally contacting the surface of the shaft extension.

2. The combination with a casing having an opening therein, of a shaft projecting through said opening, an axially adjustable plug closing the opening in said casing, said shaft projecting through said plug, sealing means associated with said shaft and plug, a shoulder on said shaft, a collar, spring means associated with said collar and plug to hermetically seal said collar to said shoulder, and an expansible sheath sealed to said collar and casing, defining an expansible chamber partially housing said spring means.

In testimony whereof I have hereunto subscribed my name.

WILLIAM WISHART.